US006803922B2

(12) United States Patent
Marino (10) Patent No.: US 6,803,922 B2
(45) Date of Patent: Oct. 12, 2004

(54) PIXEL FORMATTER FOR TWO-DIMENSIONAL GRAPHICS ENGINE OF SET-TOP BOX SYSTEM

(75) Inventor: Charles F. Marino, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 10/077,563

(22) Filed: Feb. 14, 2002

(65) Prior Publication Data

US 2003/0151612 A1 Aug. 14, 2003

(51) Int. Cl.[7] .................................................. G01G 5/02
(52) U.S. Cl. ........................ 345/603; 345/589; 345/600; 345/604; 345/605
(58) Field of Search ................................. 345/600–605, 345/589

(56) References Cited

U.S. PATENT DOCUMENTS

| | | | |
|---|---|---|---|
| 5,757,967 A | 5/1998 | Gonzales et al. ........... 382/233 |
| 5,798,753 A | 8/1998 | Zhou et al. .................. 345/154 |
| 5,867,145 A | * | 2/1999 | Beheler ....................... 345/605 |
| 5,959,637 A | 9/1999 | Mills et al. .................. 345/506 |
| 6,009,191 A | 12/1999 | Julier .......................... 382/166 |
| 6,028,611 A | 2/2000 | Anderson et al. ........... 345/506 |
| 6,111,584 A | 8/2000 | Murphy ...................... 345/430 |
| 6,189,064 B1 | 2/2001 | MacInnis et al. ........... 710/244 |
| 6,292,168 B1 | * | 9/2001 | Venable et al. ............. 345/605 |
| 6,538,658 B1 | * | 3/2003 | Herrera ....................... 345/582 |
| 6,542,162 B1 | * | 4/2003 | Hrusecky et al. ........... 345/629 |

* cited by examiner

Primary Examiner—Matthew C. Bella
Assistant Examiner—Po-Wei Chen
(74) Attorney, Agent, or Firm—William H. Steinberg, Esq.; Kevin P. Radigan, Esq.; Heslin Rothenberg Farley & Mesiti, P.C.

(57) ABSTRACT

A technique is provided for aligning and formatting multi-operand pixel data, for example, within a pixel formatter of a graphics engine for a set-top box system. The technique includes, in one embodiment, obtaining pixel data of a first alignment and a first format for conversion to a second alignment and a second format. The pixel data undergoes pre-alignment where the first alignment of the pixel data is changed to a bit zero alignment, after which the pixel data is reformatted from the first format to the second format. The reformatted pixel data is post-aligned to change from bit zero alignment to the second alignment. In one embodiment, the pixel data is source pixel data or pattern pixel data, while the second alignment and the second format are alignment and format of destination pixel data.

20 Claims, 4 Drawing Sheets fig. 1 fig. 2 fig. 3 fig. 4

PIXEL FORMATTER FOR TWO-DIMENSIONAL GRAPHICS ENGINE OF SET-TOP BOX SYSTEM

TECHNICAL FIELD

The present invention relates generally to computer graphics systems, and more particularly, to a multi-format, multi-operand pixel formatter for a graphics engine of a set-top box system.

BACKGROUND OF THE INVENTION

Digital electronics and, in particular, digital video systems are becoming ubiquitous in today's electronic world. One industry in which digital video systems continue to become more prevalent is television services. For instance, practically every television system now offers digital service, which requires a set-top box having a digital video system. In this setting, the digital video system can provide various functions relative to the digital television services, such as television programming information, games, internet browsing and other multimedia in a graphical format on a television display. A digital video system generally includes a processor, memory, a hardware graphics system for generating graphics, an application that provides system functionality including graphics creation, and an application program interface (API) for communicating between the application and graphics system. In operation, the digital video application provides a request for generation of a graphic to the graphics system API, and the graphics system API then generates register data for the graphics system using the digital video system processor.

Today's two-dimensional graphics engine includes a pixel formatter which can extract multiple pixel operands, such as source pixel data, destination pixel data, and pattern pixel data, from separate memory buffers each having potentially different pixel formats and sizes. Once extracted, the pixel data enters a two-dimensional pipeline where multiple arithmetic and/or boolean operations can be performed upon the data before the resulting pixels are written back to memory. Prior to entering the two-dimensional pipeline, the three operands need to be aligned so that, in one embodiment, the pixel data entering the pipe corresponds to the same x,y two-dimensional location on the screen.

The present invention addresses the problem of how to manage what is an exceedingly complex number of input variables, alignments, and formats in a bounded manner within a pixel formatter of a two-dimensional graphics engine.

SUMMARY OF THE INVENTION

Alignment and formatting of the above-discussed operands is recognized herein to be exceedingly difficult when one or more of the following is true:

1. The source and destination pixel data support 1, 4, 8, 16, and 32 bit pixel sizes starting on a 1, 4, 8, 16 or 32 bit boundaries, respectively.
2. The pattern pixel data supports 1 bit or 8 bit pixel sizes starting on a 1 bit or 8 bit boundaries, respectively.
3. The source and destination pixel data are different formats, potentially starting at different bit boundaries in memory.
4. The pattern pixel data is a different format from the source and destination pixel data, with all having different starting bit addresses in memory.

Disclosed herein is a technique implementable, in one embodiment, within a pixel formatter. This technique simplifies the above-noted problem by reducing the number of boundary conditions to a more manageable number, thus making a more practical implementation possible.

Briefly summarized, the present invention comprises in one aspect a method of processing pixel data. This method includes: obtaining pixel data having a first alignment and a first format for conversion to a second alignment and a second format; pre-aligning the pixel data from the first alignment to a bit zero alignment; converting format of the pixel data from the first format to the second format; and post-aligning the pixel data in the second format from the bit zero alignment to the second alignment.

In enhanced embodiments, the pixel data includes either source pixel data or pattern pixel data retrieved from memory within a set-top box system, and the second alignment and second format are an alignment and a format of destination pixel data within the system. As a specific example, the pre-aligning can include pre-aligning the source pixel data or pattern pixel data to bit zero of a 32 bit word (i.e., assuming the system is a 32 bit system), wherein the first format is 1, 4, 8, 16 or 32 bits per pixel, and the second format is 16 or 32 bits per pixel.

Systems and computer program products corresponding to the above-summarized methods are also described and claimed herein.

To restate, presented herein is a pixel format and alignment technique which justifies the source and pattern pixel data to the destination pixel alignment. Thus, no shifting of the destination pixel data flow is required, which greatly simplifies the control logic as well as saving in the amount of shift circuitry. The approach presented is also easily scalable as well as configurable. A pixel formatter implementing this technique can support many different pixel formats and sizes. Prior to starting a two-dimensional graphics operation, a pixel formatter would be configured based on the source, destination and/or pattern pixel formats. This data is used to configure the dimensions of the input FIFOs, to initialize the data flow start-up conditions (alignments), and the data flow shift increment sizes. This is done independent from both the source and pattern data flows, since they are slaves to the destination pixel data flow.

A pixel formatter implemented as described herein is scalable because the same circuitry is easily used for the source pixel data flow as the pattern pixel data flow. This allows a capability for additional operands to be fetched and aligned from memory. The pattern pixel data flow can be a subset of the source pixel data flow as explained herein. (Basically, the palette look-up table array and logic of the source pixel data flow would not be used in the case of the pattern pixel data flow.)

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

Figure 1:
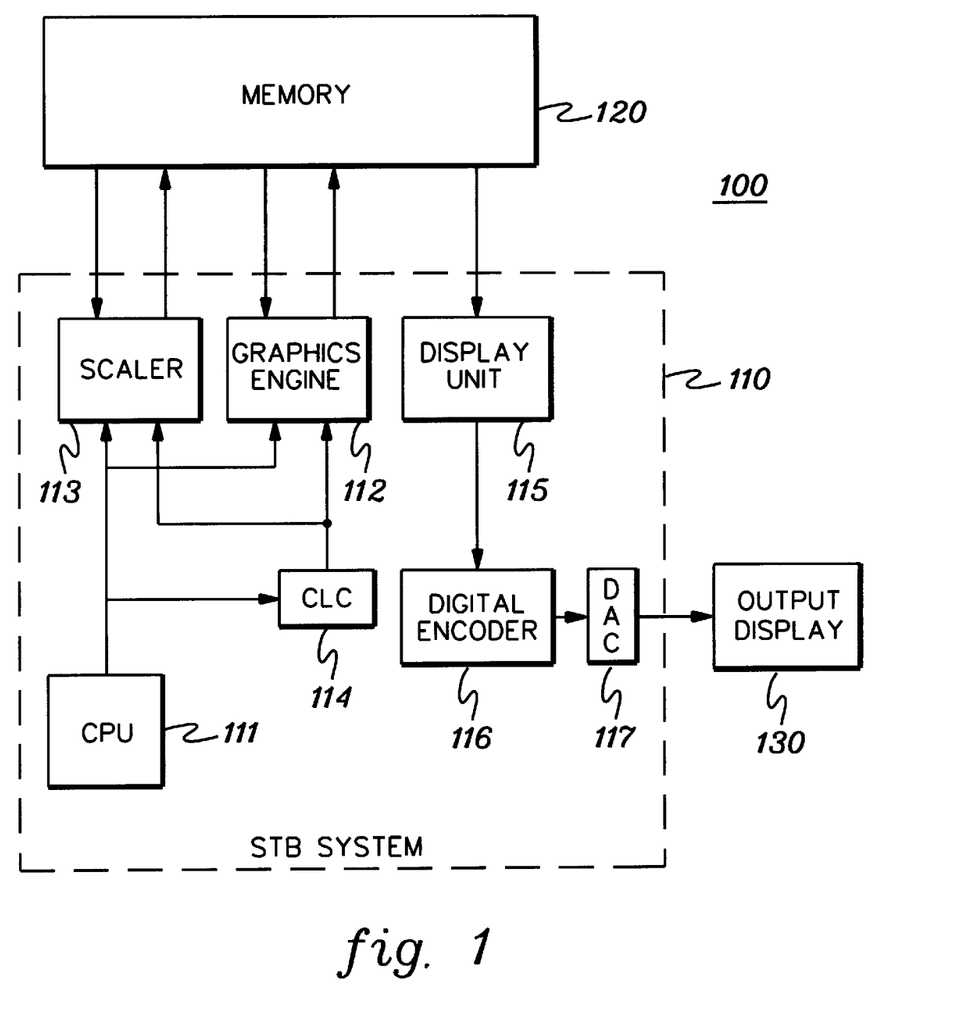
FIG. 1 is a partial block diagram of a set-top box system employing a graphics engine, in accordance with an aspect of the present invention.

FIG. 1 depicts one embodiment of a video system, generally denoted 100, to employ certain aspects of the present invention. System 100 includes a set-top box (STB) system 110, a memory 120 and an output display 130. STB system 110 might also include video and audio decoders (not shown). Memory 120 may comprise any known type of data storage system and/or transmission media, including magnetic media, optical media, random access memory (RAM), read only memory (ROM), a data object, etc. Moreover, memory 120 may reside at a single physical location comprising one or more types of data storage, or be distributed across a plurality of physical systems. Display 130 may comprise any known type of input/output device, including a network system, modem, video/audio display device, printer, cable system, etc.

In this example, STB system 110 is assumed to be a set-top box configured to provide various digital television service functionality, including generating graphics for overlay in a television display. System 110 includes a central processing unit (CPU) 111, which may comprise a single processing unit, or a plurality of processing units distributed across one or more locations. As an example, unit 111 may comprise an IBM PowerPC® unit. CPU 111 can control all set-top box operations, including the decode functions and the presentation of graphics.

The set-top box system further includes a graphics engine 112, which in one embodiment, implements various aspects of the present invention. Expansion and reduction of graphic images can be carried out through a scaler 113. A command list controller (CLC) 114 may function as a display list processor and include a list of operations off-loaded from CPU 111. Both graphics engine 112 and scaler 113 read data from and write data to memory 120. In one embodiment, memory 120 includes the graphics image or pixel data, such as the source, destination and pattern pixel data discussed below. Any video input may also pass through memory 120.

A display unit 115 reads in inputs for display and blends any video image with the graphics data into a single display screen. A digital encoder 116 encodes the resultant blended screen, for example, for NTSC presentation. A digital to analog converter (DAC) 117 converts the standardized image and passes the image to (for example) an output display 130, such as a video display monitor.

Figure 2:
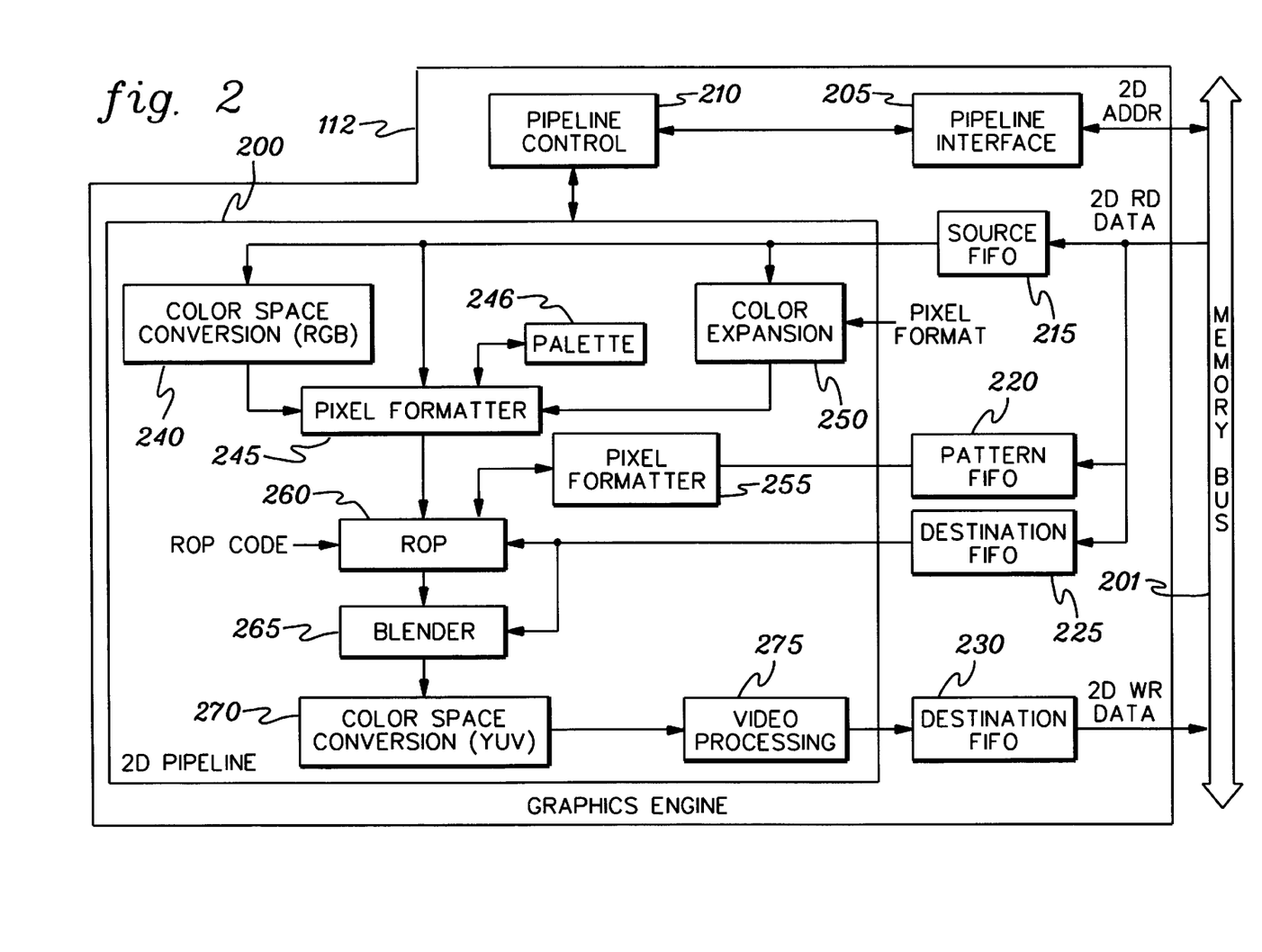
FIG. 2 is a block diagram of one embodiment of a graphics engine having a two-dimensional (2D) pipeline with pixel formatters, in accordance with an aspect of the present invention.

FIG. 2 depicts one embodiment of a graphics engine 112 to implement aspects of the present invention. This 2D graphics engine stores data to and retrieves data from memory (such as memory 120 of FIG. 1) across a memory bus 201. A memory interface 205 provides addressing information for the data read and write operations to memory, while a pipeline control 210 provides information on pixel sizes, formatting of source pixel data, destination pixel data and pattern pixel data, and controls data movement within the 2D graphics pipeline 200 of engine 112. Source data, pattern data and destination data is read in from memory and initially buffered in source FIFO 215, pattern FIFO 220 and destination FIFO 225, respectively. An output FIFO 230 buffers output data to be written to the destination address originally read from in memory. A typical graphics operation might include one to three read functions for reading in source pixel data, pattern pixel data and/or destination pixel data, and provides an output corresponding to the processing performed thereon.

As noted, engine 112 includes at least one graphics pipeline or 2D pipeline 200. One example of a graphics pipeline is described in U.S. Pat. No. 5,959,637 entitled "Method and Apparatus for Executing A Raster Operation In A Graphics Controller Circuit", the entirety of which is hereby incorporated herein by reference.

Figure 3:
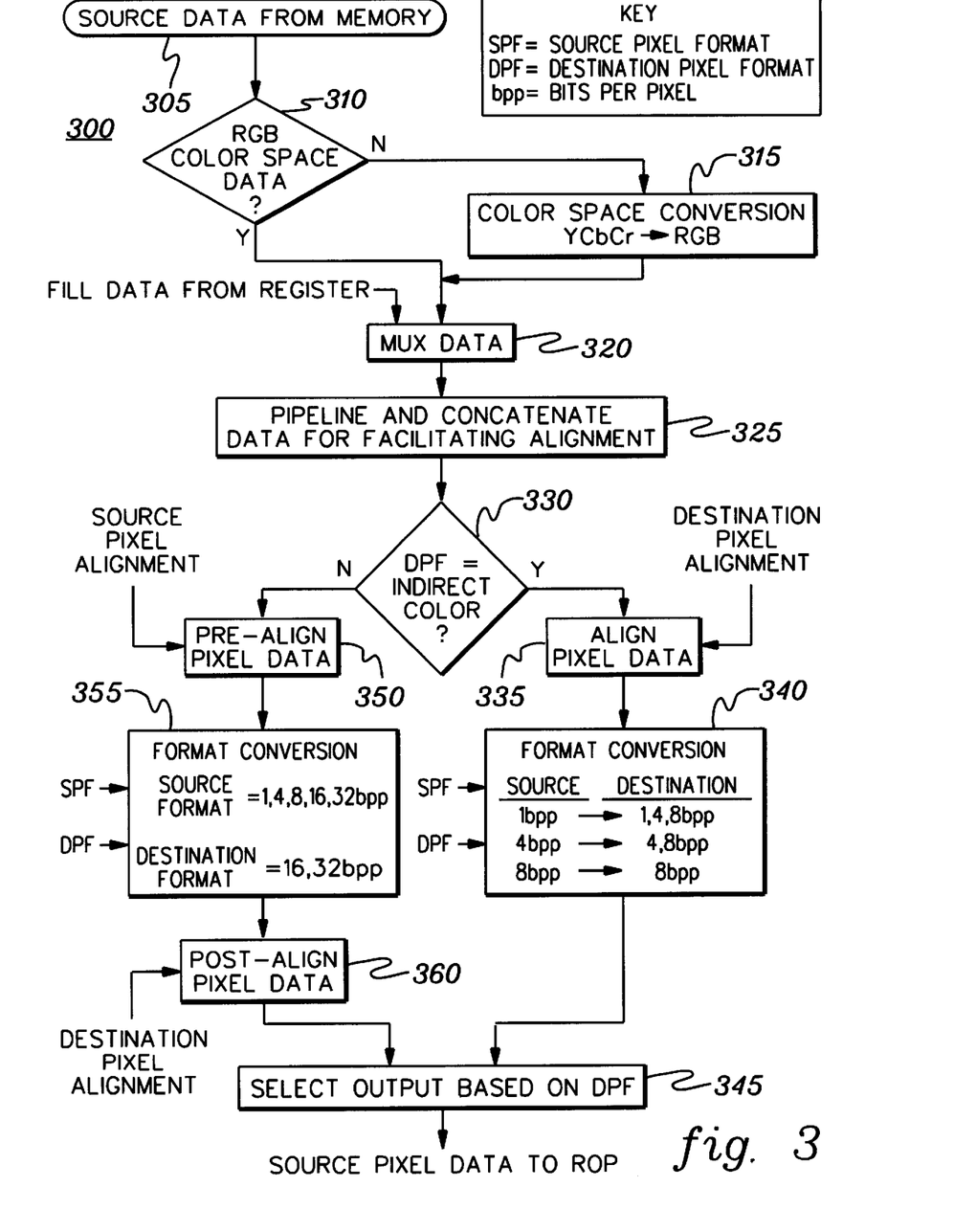
FIG. 3 is a flowchart of one embodiment of source pixel formatting, in accordance with an aspect of the present invention.

As shown in FIG. 2, pipeline 200 receives as input source pixel data from source FIFO 215, pattern pixel data from pattern FIFO 220, and destination pixel data from destination FIFO 225. In this embodiment, the source pixel data passes through color space conversion logic 240, where the source pixel data is converted from YCbCr to RGB format, before forwarding to a pixel formatter 245. Source pixel formatter 245, one processing embodiment of which is depicted in FIG. 3, aligns and formats the source pixel data to, for example, the destination pixel data. A palette 246 comprises an indexed color array or color look-up table which may be used to further reformat the source pixel data if necessary. A color expansion unit 250 can be used to expand the source pixel data out to the destination pixel format when needed. The pixel format is input to the color expansion unit 250 from, for example, CPU 111 or CLC 114 of FIG. 1.

Figure 4:
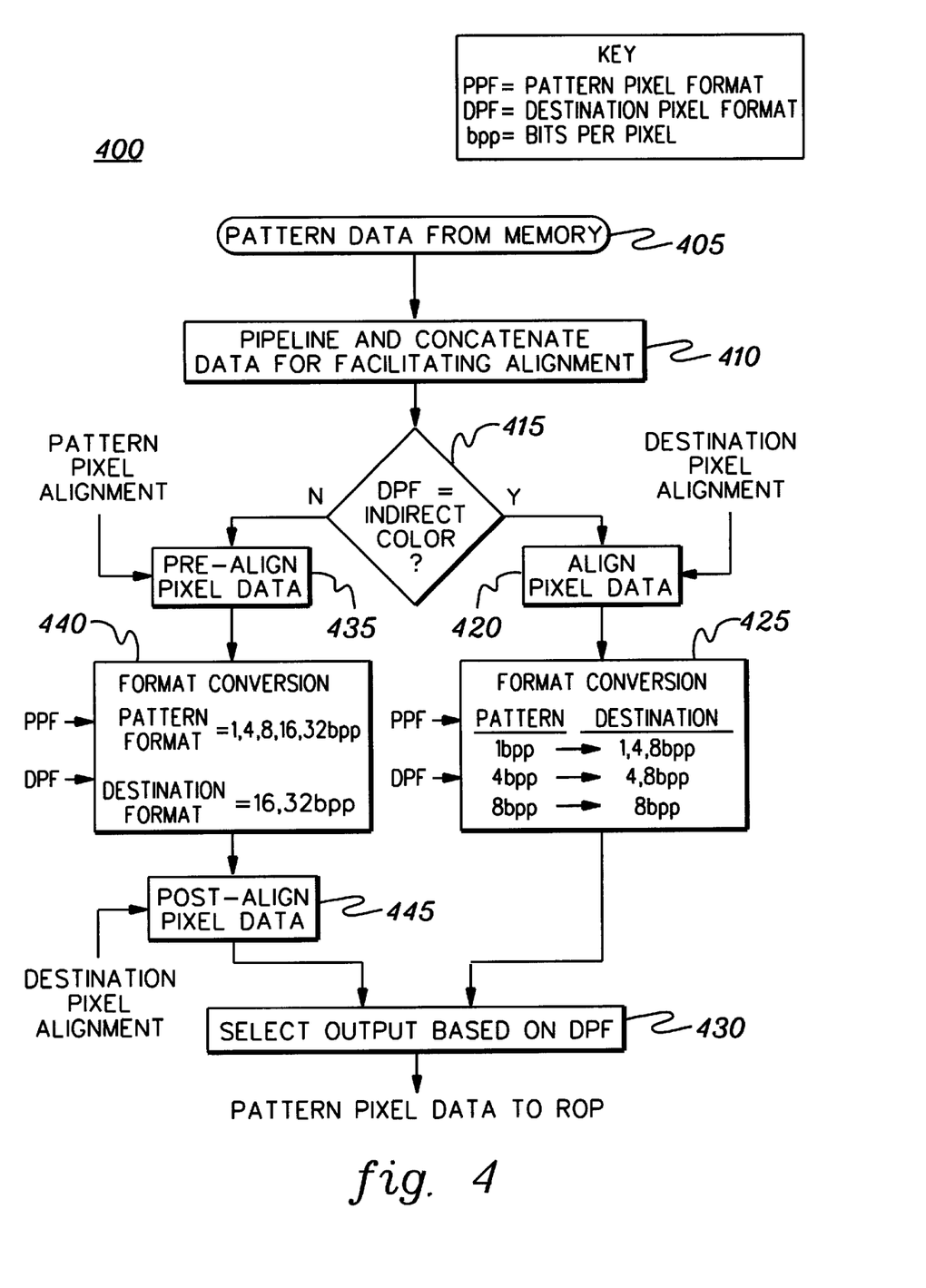
FIG. 4 is a flowchart of one embodiment of pattern pixel formatting, in accordance with an aspect of the present invention.

A second, pattern pixel formatter 255, which may simply comprise a subset of the source pixel data formatter 245, receives the pattern pixel data for formatting. One process embodiment of pixel formatter 255 in accordance with an aspect of the present invention is depicted in FIG. 4 and described below.

Output from pixel formatters 245 & 255 is sent to raster operation logic (ROP) 260 in this embodiment. Also input to the raster operation 260 are the destination pixel data, if retrieved, and an ROP code which controls the operation performed by ROP unit 260. By way of example, the raster operation could comprise any boolean operation to be performed on the source pixel data, pattern pixel data and/or destination pixel data, such as copying the source pixel data to the destination pixel data, or ANDing the source pixel data and destination pixel data, etc. The raster operation, which typically comprises part of a boolean logic unit within the graphics engine, is described in greater detail in co-pending, commonly assigned U.S. patent application Ser. No. 10/056,318, entitled "Raster Operation Unit" by C. Marino, filed Jan. 22, 2002, the entirety of which is hereby incorporated herein by reference.

Output from the raster operation unit is passed through a blender 265, which also (in this embodiment) receives input from the destination FIFO 225. Blender 265, in one example, may mix the output of the raster operation unit with the destination pixel data. One example of blender logic is described in co-pending, commonly assigned U.S. patent application Ser. No. 10/057,817, entitled "Enhanced Blending Unit Performance In Graphics System", by Marino et al., filed Jan. 22, 2002, the entirety of which is hereby incorporated herein by reference.

Output from blender 265 is to a color space conversion unit 270 for converting the RGB data back to YUV data, and then through a video processing unit 275, for example, to adjust brightness or contrast. The output of video processing unit 275 is to output FIFO 230 for buffering and subsequent writing of the outputted pixel data back to memory; for example, to the same destination address as the destination pixel data was originally read from.

As noted briefly above, prior to entering the 2D pipeline, the three operands (i.e., source pixel data, pattern pixel data and destination pixel data) need to be aligned and commonly formatted so that each of the pixels entering the pipe corresponds to the same x,y 2D location on the resultant display screen. This can be very difficult when one or more of the following is true: (1) the source and destination pixel data support 1, 4, 8, 16 and 32 bit pixel sizes starting on a 1, 4, 8, 16 or 32 bit boundaries, respectively; (2) the pattern pixel data supports 1 bit or 8 bit pixel sizes starting on a 1 bit or 8 bit boundaries, respectively; (3) the source and destination pixel data are different formats potentially starting at a different bit boundary in memory; and (4) the pattern pixel data is a different format from the source and destination pixel data, all having different starting bit addresses in memory.

This invention addresses how to manage the above-summarized complex number of input variables, alignments and formats in a bounded manner within a pixel formatter of the graphics pipeline. The disclosure describes how the pixel formatter can simplify the problem by reducing the number of boundary conditions to a more manageable number.

Generally stated, a pixel formatter implemented in accordance with aspects of the present invention reduces complexity of the problem by the following:

(1) The destination pixel data alignment is not shifted. Only the source and pattern pixel data are adjusted, and these are adjusted to match the destination alignment. This eliminates any need for shift logic for the destination data prior to entering the 2D pipeline, as well as exiting the 2D pipeline.

(2) The source and pattern pixel data go through a "pre-alignment" stage and a "post-alignment" stage when the destination pixel format is a direct color format. During pre-alignment, the source and pattern pixels are adjusted as if the destination address is left justified, i.e., aligned to bit 0 (e.g., in a 32 bit word boundary). This is referred to herein as zero bit alignment. Next, if the source or pattern pixel formats are different from the destination pixel format, pixel format conversion is performed. Finally, the source and pattern pixels are post-aligned to adjust their alignment from the zero bit alignment to the destination pixel alignment. By performing the alignment and formatting in three separate stages, the factors that determine alignment of all three pixel inputs is greatly simplified. Further, this eliminates the source/pattern address and source/pattern pixel size factors during post-alignment, which are handled in the pre-alignment stage prior to any format conversions. The above-summarized approach reduces design complexity by an order of magnitude.

FIG. 3 depicts one embodiment of a source pixel formatter in accordance with an aspect of the present invention. This source pixel formatting process, generally denoted 300, begins with obtaining source pixel data from memory 305. Processing then determines whether the source pixel data is RGB color space data 310; and if "no", performs color space conversion from YCbCr to RGB format 315. The RGB formatted source pixel data is multiplexed with fill data from a fill register 320. The fill data is used if needed based on the format of the source pixel data. The data enters a pipeline and is concatenated, for example, to 64 bits for facilitating alignment of the source pixel data 325.

Determination is now made whether the destination pixel format is a direct color or indirect color format. In one example, a direct color format comprises a format wherein the destination pixel data is greater that 8 bits per pixel, while an indirect color format is assumed to comprise less than or equal to 8 bits per pixel. If the destination pixel format is an indirect color format, then processing aligns the source pixel data directly to the destination pixel alignment 335. The aligned source pixel data then undergoes format conversion 340. The source pixel format (SPF) and destination pixel format (DPF) are inputs to the conversion logic. If the source format comprises 1 bit per pixel, then the destination format may comprise 1,4 or 8 bits per pixel (bpp), if the source pixel format is 4 bpp, then the destination may comprise 4 or 8 bpp, while if the source pixel format is 8 bpp, then the destination pixel format may comprise 8 bpp. Conversion from a 1 bpp, 4 bpp or 8 bpp source pixel format can be accomplished as follows:

1 pp Source Pixel Format (Monochrome)

1-bit source pixels can be converted to any direct or indirect (indexed) color. If the source pixel is b'0' (binary zero), then the pixel is expanded to the value in the background register (set by the software driver). If the source pixel is b'1' (binary one), then the pixel is expanded to the value in the foreground register. The size of the converted pixel is based on the destination pixel format. If the destination pixel format is 4 bpp, then 4 (four) bits will be taken from the foreground or background register. If the destination pixel format is 8 bpp, then 8 bits will be taken from the foreground or background register, etc.

4 bpp Source Pixel Format (4-bit indexed color or CLUT4 {color look-up})

4-bit source pixels can be converted to any direct or indirect (indexed) color except 1 bpp. A conversion to an 8-bit index is done by padding zeros to the four most significant bits. Conversion to the direct RGB color formats is performed using palette look-up.

8 bpp Source Pixel Format (8-bit indexed color or CLUT8)

8-bit source pixels can be converted to any direct color or to 8 bpp indirect color. Conversion to the direct RGB color formats is performed using palette look-up.

After format conversion, the newly aligned, and reformatted source pixel data is output, for example, to the raster operation (ROP) 345.

If the destination pixel format is a direct color format, for example, is 16 or 32 bpp, then the pixel format processing initially pre-aligns the source pixel data 350. The source pixel alignment is known and is used to shift the data to a zero bit alignment, for example, to justify the source pixel data to the 0 bit of a 32 bit word (which assumes that the system is a 32 bit system). This pre-alignment of the source pixel data is performed without reference to the destination pixel alignment. The source pixel data then undergoes format conversion with the source pixel format and destination pixel format being inputs to the conversion logic 355. Since the destination pixel format is a direct color format, the source pixel format is converted from 1, 4, 8, 16, 32 bpp to either one of a 16 or 32 bpp, by way of example. Again, format conversion can proceed as follows:

1 bpp (bit per pixel) Source Pixel Format (Monochrome)

1-bit source pixels can be converted to any direct or indirect (indexed) color. If the source pixel is b'0' (binary zero), then the pixel is expanded to the value in the background register (set by the software driver). If the source pixel is b'1' (binary one), then the pixel is expanded to the value in the foreground register. The size of the converted pixel is based on the destination pixel format.

4 bpp Source Pixel Format (4-bit indexed color or CLUT4 {color look-up})

Conversion to the direct RGB color formats is performed using palette look-up. If the destination pixel format is 32 bpp, then the 32 bit value from the palette for that 4-bit index is the converted source pixel. If the destination pixel format is 16 bpp, then the 32 bit value from the palette for that 4-bit index is reduced using truncation or some other reduction algorithm.

8 bpp Source Pixel Format (8-bit indexed color or CLUT8)

Again, conversion to the direct RGB color formats is performed using palette look-up. If the destination pixel format is 32 bpp, then the 32 bit value from the palette for that 8-bit index is the converted source pixel. If the destination pixel format is 16 bpp, then the 32 bit value from the palette for that 8-bit index is reduced using truncation or some other reduction algorithm.

16 bpp Source Pixel Format (16-bit direct color)

16-bit direct color source pixels can be converted to any other direct RGB color. Conversion to a 32-bit direct color requires an expansion operation on each of the color components to expand the 16-bit direct color to a 32-bit direct color. (For example ARGB4444 pixels have 4 bits for each color component. ARGB8888 have 8 bits for each color component. In order to convert ARGB4444 to ARGB8888, each color component must be expanded from 4-bits to 8-bits.) This can be done by several known expansion algorithms. Conversion to another 16-bit direct color may require expansion or reduction depending on the specific pixel format and the color depth of each color component. For example, ARGB4444 to RGB565 will require the R, G, and B color components to be expanded by 1, 2, and 1 bit, respectively.

32 BPP Source Pixel Format (32-bit direct color)

32-bit direct color source pixels can be converted to any other direct RGB color. Conversion to a 16-bit direct color requires a reduction operation on each of the color components to reduce a 32-bit direct color to a 16-bit direct color. (For example, ARGB8888 pixels have 8 bits for each color component. ARGB4444 have 4 bits for each color component. In order to convert ARGB8888 to ARGB4444, each color component must be reduced from 8-bits to 4-bits.) This can be done by several known reduction algorithms, such as truncation or error rounding.

After completing format conversion, the reformatted source pixel data is post-aligned to the destination pixel alignment 360. This post-alignment of the reformatted source pixel data occurs without reference to the original source pixel alignment. If the destination pixel alignment is of a 32 bit word, then no further alignment is necessary. If the destination pixel alignment is to a 16 bit word, then the source pixel data is realigned from the zero bit alignment to the destination pixel alignment. The post-aligned pixel data is then forwarded for output through selection logic 345, for example, to the raster operation (ROP) logic discussed above.

FIG. 4 depicts one embodiment of pixel processing logic, generally denoted 400, for the pattern pixel data. Again, this processing can be thought of as a subset of the source pixel processing discussed above.

The pattern pixel data is retrieved from memory 405 and forwarded through a pipeline for concatenation of the data, for example, to create 64 bits of data for facilitating subsequent alignment thereof 410. Similarly to the logic of FIG. 3, processing determines whether the destination pixel format is an indirect color format. If "yes", then the source pixel data is directly aligned to the destination pixel data 420 and format conversion 425 is performed in analogous manner to that described above in connection with the source pixel data. Output from format conversion 425 passes through selection logic 430 and is provided, in one embodiment, to the raster operation (ROP) logic described above.

If the destination pixel format is a direct color format, then the pattern pixel data is pre-aligned 435 to a bit zero alignment (e.g., of a 32 bit word, assuming the existence of a 32 bit process flow). This pre-alignment of pattern pixel data is performed without reference to the destination pixel alignment. The pattern pixel data is then formatted to the destination pixel format 440. Pixel format conversion 440, which receives as input the pattern pixel format (PPF) and the destination pixel format (DPF), converts the pattern pixel data to the destination pixel format in analogous manner to that described above in connection with the source pixel data. After format conversion, the reformatted pattern pixel data undergoes post-alignment 445 to align the data to the destination pixel alignment. This post-alignment again is performed without reference to the original pattern pixel alignment. The resultant aligned and reformatted pattern pixel data is then selected for output 430 to the raster operation (ROP) logic.

A specific example of the pre-alignment and post-alignment processing described above is provided below.

For this example the following parameters are assumed defined by the software driver in order to perform a pixel format conversion from a 4-bit indexed source pixel block (string) to a 16-bit direct color destination block (string):

Source Pixel Format (SPF)=4-bit CLUT indexed color

Destination Pixel Format (DPF)=16-bit ARGB444 direct color

Source X,Y pixel=5,0 (corresponds to a physical bit address of x'20000005')

Destination X,Y pixel=1,0 (corresponds to a physical bit address of x'30000010')

CLUT entry 0=x'80FF 0000 ARGB8888 (red color)

CLUT entry F=x'C000 FFF' ARGB8888 (yellow color)

| Step | Stage | Source Pixel Data |
|---|---|---|
| 1. | Memory | b'xxxx x111 1000 0111 1000 0111 1000 0111' |
| 2. | After pre-alignment | b'1111 0000 1111 0000 1111 0000 1111 0000' |
| 3. | After palette look-up | x'C000 FFFF 80FF 0000 C000 FFFF 80FF 0000 C000 FFFF 80FF 0000 C000 FFFF 80FF 0000' |
| 4. | After format conversion | X'C0FF 8F00 C0FF 8F00 C0FF 8F00 C0FF 8F00' |
| 5. | After post-alignment | x'xxxx C0FF 8F00 C0FF 8F00 C0FF 8F00 C0FF' |

In the example above, the source pixel data (string) starts at a bit address of x'5' ecause we are starting at pixel 5 in the string (pixel 0 starts at bit address b'0'). Note that the source pixel data initially has the same alignment as in memory. Since the destination pixel format is greater than 8 bits per pixel it is a direct color format. Therefore, the left branch of FIG. 3 is taken. The first process (step 2) is to pre-align the source pixel string to bit address b'0' (32-bit word aligned). After pre-alignment, the source pixel data (CLUT4) is converted to the destination pixel format (ARGB4444). Since the source pixel data is an indirect color, the palette is referenced using the 4-bit index which the source pixel represents (step 3). In this example, an alternating 4-bit value of b'1111' (x'F') and b'0000' (X'0'is provided. This value will return a value of x'C000 FFFF' and x'80FF 0000' ARGB8888, respectively. In step 4, the ARGB8888 palette value is converted to ARGB4444 for every pixel. After the format conversion, the pixel data is post-aligned (step 5) in order to match the destination alignment of bit address x'10'.

After completion of the above-described steps, the formatted pixel data advances to the raster operation unit (ROP) as shown in FIG. 2. It is now aligned with the destination pixel data. Pattern data undergoes similar processing as described above for the source pixel data, in order to be aligned properly with the destination pixel data.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of processing pixel data, comprising:
   obtaining pixel data of a first alignment and a first format for conversion to a second alignment and a second format;
   pre-aligning the pixel data from the first alignment to a bit zero alignment;
   converting format of the pixel data from the first format to the second format; and
   post-aligning the pixel data in the second format from the bit zero alignment to the second alignment.

2. The method of claim 1, wherein the second format comprises a direct color format.

3. The method of claim 1, wherein the first alignment and the second alignment comprise different alignments of data.

4. The method of claim 1, wherein the pixel data comprises at least one of source pixel data or pattern pixel data retrieved from memory within a set-top box system, and wherein the second alignment and the second format comprise an alignment and a format of destination pixel data of the set-top box system.

5. The method of claim 4, wherein the pre-aligning comprises pre-aligning the at least one of source pixel data or pattern pixel data to bit zero of a 32 bit word, and wherein the first format comprises one of a 1, 4, 8, 16 or 32 bits per pixel format, and the second format comprises one of a 16 or 32 bits per pixel format.

6. The method of claim 1, wherein the method is implemented within a pixel formatter of a two-dimensional graphics processing engine.

7. The method of claim 1, wherein the pre-aligning and the post-aligning are performed when the second format comprises a direct color format, and wherein the method further includes directly aligning the pixel data of the first alignment to the second alignment when the second format comprises an indexed color format.

8. A system for processing pixel data, comprising:
   means for obtaining pixel data of a first alignment and a first format for conversion to a second alignment and a second format;
   means for pre-aligning the pixel data from the first alignment to a bit zero alignment;
   means for converting format of the pixel data from the first format to the second format; and
   means for post-aligning the pixel data in the second format from the bit zero alignment to the second alignment.

9. The system of claim 8, wherein the second format comprises a direct color format.

10. The system of claim 8, wherein the first alignment and the second alignment comprise different alignments of data.

11. The system of claim 8, wherein the pixel data comprises at least one of source pixel data or pattern pixel data retrieved from memory within a set-top box system, and wherein the second alignment and the second format comprise an alignment and a format of destination pixel data of the set-top box system.

12. The system of claim 11, wherein the means for pre-aligning comprises means for pre-aligning the at least one of source pixel data or pattern pixel data to bit zero of a 32 bit word, and wherein the first format comprises one of a 1, 4, 8, 16 or 32 bits per pixel format, and the second format comprises one of a 16 or 32 bits per pixel format.

13. The system of claim 8, wherein the system comprises a pixel formatter of a two-dimensional graphics processing engine.

14. The system of claim 8, wherein the means for pre-aligning and the means for post-aligning are performed when the second format comprises a direct color format, and wherein the system further includes means for directly aligning the pixel data of the first alignment to the second alignment when the second format comprises an indexed color format.

15. At least one program storage device readable by a machine, tangibly embodying at least one program of instructions executable by the machine to perform a method of processing pixel data, the method comprising:
   obtaining pixel data of a first alignment and a first format for conversion to a second alignment and a second format;
   pre-aligning the pixel data from the first alignment to a bit zero alignment;
   converting format of the pixel data from the first format to the second format; and
   post-aligning the pixel data in the second format from the bit zero alignment to the second alignment.

16. The at least one program storage device of claim 15, wherein the second format comprises a direct color format.

17. The at least one program storage device of claim 15, wherein the first alignment and the second alignment comprise different alignments of data.

18. The at least one program storage device of claim 15, wherein the pixel data comprises at least one of source pixel data or pattern pixel data retrieved from memory within a set-top box system, and wherein the second alignment and the second format comprise an alignment and a format of destination pixel data of the set-top box system.

19. The at least one program storage device of claim 18, wherein the pre-aligning comprises pre-aligning the at least one of source pixel data or pattern pixel data to bit zero of a 32 bit word, and wherein the first format comprises one of a 1, 4, 8, 16 or 32 bits per pixel format, and the second format comprises one of a 16 or 32 bits per pixel format.

20. The at least one program storage device of claim 15, wherein the method is implemented within a pixel formatter of a two-dimensional graphics processing engine.

* * * * *